Patented July 19, 1927.

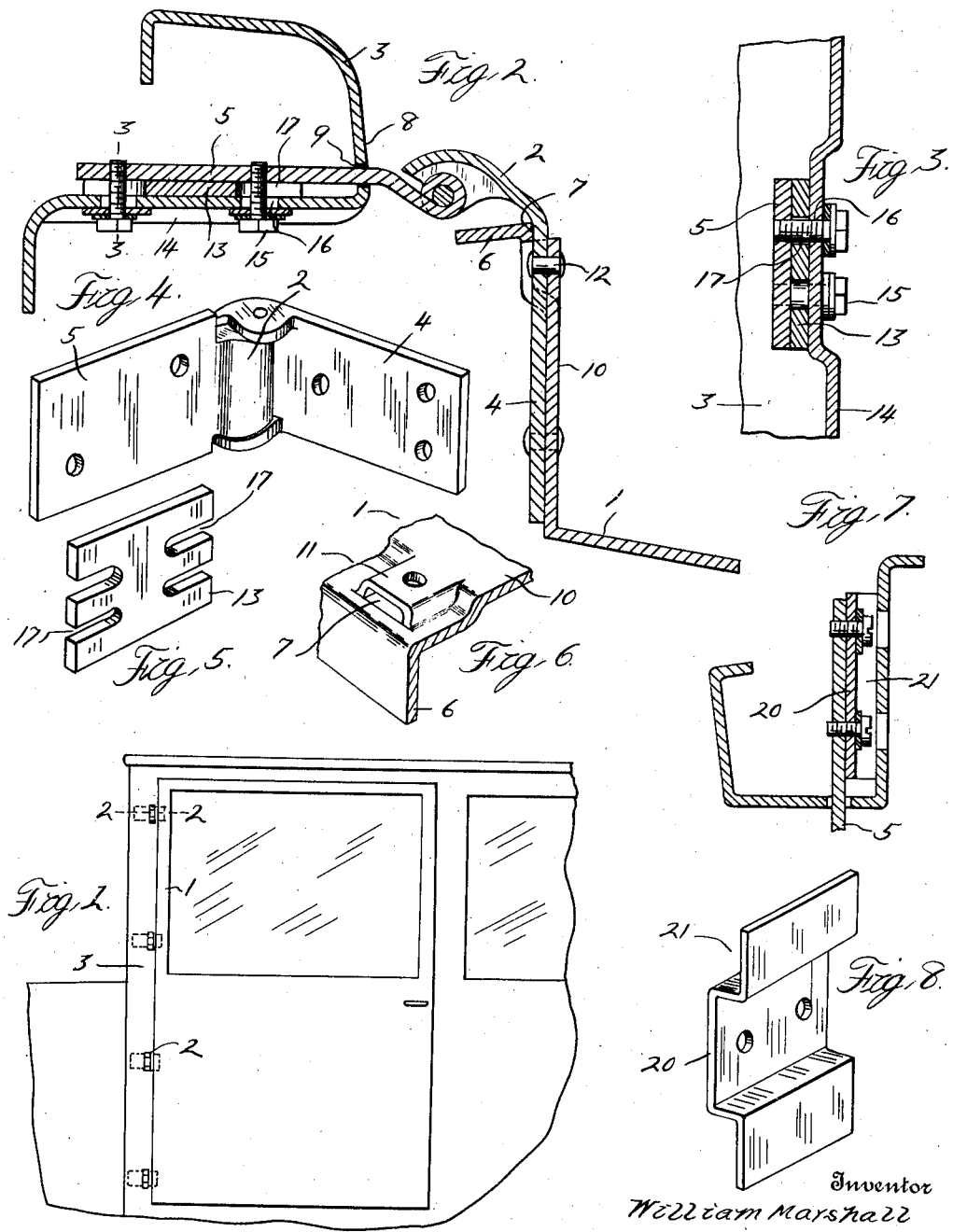

1,636,007

UNITED STATES PATENT OFFICE.

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN.

HINGE CONSTRUCTION.

Application filed May 24, 1926. Serial No. 111,420.

This invention relates generally to hinge constructions and refers more particularly to vehicle body door hinges and the like.

One of the essential objects of the invention is to provide a strong and durable construction that can be manufactured at a comparatively low cost and can be easily and quickly assembled with the door and body pillars of the vehicle body.

Another object is to provide such a hinge with attaching and reinforcing means that will permit the use of relatively light gauge sheet metal for the door and body pillars.

With the above and other objects in view, the invention resides in certain novel features of construction, combinations and arrangements of parts as will be more fully described and particularly pointed out in the appended claims.

In the accompanying drawing:

Figure 1 is a side elevation of a door pillar and a supporting body pillar with hinges attached thereto.

Figure 2 is a horizontal sectional view taken on the line 2—2 of Figure 1.

Figure 3 is a fragmentary sectional view taken on the line 3—3 of Figure 2.

Figure 4 is a detail perspective view of one of the hinges.

Figure 5 is a detail perspective view of one of the spacer plates.

Figure 6 is a fragmentary perspective view of the door pillar.

Figure 7 is a fragmentary horizontal sectional view through a slightly modified form of construction.

Figure 8 is a detail perspective view of one of the attaching brackets shown in Figure 7.

Referring now to the drawing, 1 is a door pillar that is supported by a plurality of hinges 2 upon a suitable pillar 3 of a vehicle body. As shown, each hinge 2 has the pivotally connected strap members 4 and 5 respectively that are secured to the pillars 1 and 3. In the present instance, the pillar 1 is substantially Z-shaped in cross section and is provided at spaced points along the inner flange 6 with suitable openings 7 that receive the strap members 4, while the supporting pillar 3 is preferably U-shaped in cross section and is provided at spaced points of the base 8 thereof with suitable openings 9 that receive the strap members 5. Preferably, the web 10 of the pillar 1 is offset inwardly at each side of the opening 7, thereby forming U-shaped loop portions 11 that embrace the strap members 4. Any suitable means such as the rivets 12 may be used to secure the strap members 4 to the web 10 of the pillar 1.

As shown, in Figure 2, a spacer plate 13 is positioned between the strap member 5 and the inner side wall 14 of the pillar 3, while suitable screws 15 extend through registering slots 16 and 17 respectively in the wall 14 and plates 13 and threadedly engage the strap members 5. As shown, these plates 13 are provided at each end with the spaced elongated open ended slots 17 that are adapted to receive the shanks of the screws 15, hence the plates 13 are interchangeable and may be readily used in reversed position. Thus, from the foregoing description, it will be apparent that the assembled door pillar 1 and hinges 2 may be easily and quickly attached to the supporting body pillar 3 by merely inserting the strap members 5 through the openings 9, then inserting the plates 13 between these strap members 5 and the side walls 14, and finally adjusting the screws 15 into the strap members 5. Thus a material saving in time and labor is effected by this arrangement. Moreover, the door may be readily removed from the body pillar and replaced without materially effecting the other parts.

In Figures 7 and 8 I have shown a slight modification in which the strap member 5 is engaged with the base 20 of a flanged U-shaped bracket 21 that is rigidly secured to the inner side of the pillar wall 14. With this construction, the slots 16 in the wall 14 are larger than the heads of the screws 15, hence the latter may be adjusted through these openings 16 when fastening the strap member 5 in place. As shown, the shanks of these screws pass freely through the bases 20 of the brackets 21 and threadedly engage the strap members 5.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. The combination with a hinge having pivotally mounted sections, of a supporting pillar including a channel-shaped member having an opening in the base of the channel receiving one section of said hinge and having slots in one side wall thereof, a spacer element upon the inside of the channel member having slots registering with the slots aforesaid, and securing means for said hinge comprising an element extending through said registering slots and threadedly engaging said hinge section.

2. The combination with a hinge having pivotally connected sections, of a pillar of substantially Z-shape in cross section having an opening in one flange thereof receiving one of said hinge sections, the web of said pillar being offset inwardly at each side of said opening thereby forming a U-shaped loop embracing said hinge section, and securing means for said hinge engaging said section and web of said pillar, one of said elements engaging the loop aforesaid.

3. A hinge assembly comprising a pillar having a substantially flat web portion and oppositely extending lateral flanges at the longitudinal edges of said web, said web having a laterally spaced depressed portion forming an intermediate loop, one of said flanges having an opening in alignment with said loop, and a hinge having pivotally connected sections, one of said sections extending through said aligned openings and loop and extending across one side of said web, and securing means for said hinge engaging said hinge section and web aforesaid.

4. In combination, a pillar having a substantially flat web, and a lateral flange at one edge of said web, a hinge having pivotally connected sections, one of said sections extending through said flange and across said web, and securing means for said hinge including a headed element extending transversely of said web and threadedly engaging said hinge section.

5. The combination with a hinge having pivotally connected sections, and a supporting pillar therefor, of securing means for said hinge comprising headed elements extending transversely of a wall of said pillar and threadedly engaging said hinge section, and a spacer member suspended loosely upon said headed elements between said hinge section and wall aforesaid of said pillar.

6. In combination, a pillar having a substantially flat web provided with a lateral flange, spaced depressed portions adjacent to said flange, and a slot between said depressed portions opening toward said flange, a hinge section extending across said web between said depressed portions and through the slot aforesaid, and securing means for said hinge section including an element extending through said section and web.

7. In combination, a hinge section having spaced threaded openings, a pillar having a substantially flat vertically extending web provided with spaced elongated slots in registration with said openings and having a flange projecting laterally from said web and provided with an opening receiving said hinge section, and securing means for said hinge section including headed elements extending freely through said web and threadedly engaging the openings aforesaid in said hinge section.

8. In combination, a pillar having a substantially flat upright web, a hinge section extending across said web, a space between said hinge section and web having a plurality of elongated slots therein, said web having elongated slots registering with certain of the slots in said spacer and said section having threaded openings registering with the slots in said web and with certain of the slots in said spacer, and headed elements extending freely through the slots in said web and spacer and threadedly engaging the threaded openings in said hinge section, the slots in said spacer being spaced about so that the other of the slots in said spacer will receive said headed elements when said spacer is in reversed position between said hinge section and web.

In testimony whereof I affix my signature.

WILLIAM MARSHALL.